United States Patent
Tu et al.

(10) Patent No.: US 7,035,960 B2
(45) Date of Patent: Apr. 25, 2006

(54) METHOD FOR INCREASING MEMORY IN A PROCESSOR

(75) Inventors: Li-Chun Tu, Taipei (TW); Ping-Sheng Chen, Chia-Yi Hsien (TW); Pao-Ching Tseng, Taipei (TW); Hung-Cheng Kuo, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 225 days.

(21) Appl. No.: 10/605,646

(22) Filed: Oct. 15, 2003

(65) Prior Publication Data

US 2004/0172516 A1    Sep. 2, 2004

(30) Foreign Application Priority Data

Feb. 27, 2003   (TW) ............................... 92104327 A

(51) Int. Cl.
*G06F 12/00* (2006.01)
(52) U.S. Cl. ........................ 711/2; 711/219; 711/212; 712/237
(58) Field of Classification Search ......... 711/211–220
See application file for complete search history.

(56) References Cited

U.S. PATENT DOCUMENTS

| 4,399,507 | A | * | 8/1983 | Cosgrove et al. ........... 712/219 |
| 5,038,280 | A | * | 8/1991 | Watanabe et al. ........... 712/237 |
| 5,481,689 | A | * | 1/1996 | Stamm et al. ............... 711/202 |
| 6,691,219 | B1 | * | 2/2004 | Ma et al. .................... 711/219 |

* cited by examiner

*Primary Examiner*—Donald Sparks
*Assistant Examiner*—Hashem Farrokh
(74) *Attorney, Agent, or Firm*—Winston Hsu

(57) ABSTRACT

A method for increasing the internal memory in a processor. The method includes providing an extended memory in the processor, adding bits to data addresses and register addresses with an address extender, and adding bits to stack addresses with a stack pointer generator so that the processor is capable of accessing memory addresses larger than the bit width of the command set of the processor. The method also includes carrying over the bits when the stack address exceeds the limit of the conventional memory and accessing the stack data exceeding the limit of the conventional memory in the extended memory.

16 Claims, 5 Drawing Sheets

METHOD FOR INCREASING MEMORY IN A PROCESSOR

BACKGROUND OF INVENTION

1. Field of the Invention

The invention relates to a method for increasing memory in a processor, and more particularly, to a method for increasing the stack memory of an internal data memory in a processor.

2. Description of the Prior Art

Micro Computer System (MCS) is a series of microprocessors produced by Intel of which the MCS-31/32 and 51/52 series processors are commonly used in the manufacture of electronic devices. Generally speaking, micro-processors have relatively few memory resources and input/output ports. For example, the MCS-51 series of processors each have a 4K-byte program memory, a 128-byte data memory, and 32 input/output ports; while the MCS-52 series of processors each have an 8K-byte program memory and a 256-byte data memory. The MCS-31/32 and 51/52 series processors are both 8-bit processors, the program memory is a ROM that stores programs written by the user,and the data memory is a RAM.

FIG. 1 is a diagram of an internal data memory 12 in the MCS-51 series processor according to the prior art. The data memory 12 is shared for use as a stack memory, a data memory, and a register memory. Addresses for the stack, data, and registers are all 8 bits, and the processor processes an 8-bit command set. When accessing the internal data memory 12, 8-bit instructions and addresses are sent to a memory address generator 14 to generate memory addresses. The internal data memory in the MCS-51 series processor is 128 bytes, while the internal memory in the MCS-52 series processor is 256 bytes. An external data memory in the MCS-51/52 series processor can be extended to 64K bytes. The internal data memory 12 is divided into several segments: a) addresses 00H-1FH: a 32-byte register bank comprising four working register banks which have 8 registers each,wherein data can be accessed by direct addressing or indirect addressing; b) addresses 20H-2FH: a bit-addressing segment of 16 bytes (128 bits), wherein bits in the bit-addressing segment can be operated on via bitwise operational instructions; c) addresses 30H-7FH: a general segment for use by the user,wherein a stack is usually located by appointing stack pointers to this segment; and d) addresses 80H-FFH: a general segment existing only in the MCS-52 series processors and accessible only by indirect addressing.

FIG. 2 is a diagram of the internal data memory 12 comprising two stacks according to the prior art. The configuration of the internal data memory 12 is shown as in FIG. 2. Some of the memory is used for registers and data, and the other memory is used for the stack. As described above, the stack is usually located in the general segment of the internal data memory 12, and the stack pointer points to a position of the general segment as a stack starting address in the beginning. The stack is used to store the program counter when calling subroutines or to store other data as specified by the user. As shown in FIG. 2, the data stored in the stack is represented by the shaded area below the stack pointer, and the stack pointer moves upwards in a direction shown by the arrow when new data is pushed into the stack. However, when calling subroutines, many programs need to send parameters and use a software stack memory to store these parameters. The parameters stored in the software stack memory are shown as the shaded area above the software stack pointer in FIG. 2, and the software stack pointer moves downwards in a direction shown by the arrow when new parameters are pushed into the software stack memory. Because the two stacks share the limited memory, the user has to be aware of how many memory resources the two stacks use when programming.

As described above, the conventional MCS-51/52 series processors provide limited internal data memory 12. The stack memory, data memory, and register memory have to share the internal data memory 12. As the complexity of computer systems increases, more stack memory and data memory is needed. Although the internal data memory 12 can be extended through the use of an external data memory, the amount of stack memory is still limited by the internal data memory 12. Accordingly, the stack memory is not adequate for complicated programs need to call many subroutines. Limited stack memory requires programs to call only a limited number of subroutines. Moreover, if subroutines have to send parameters, more stack memory is needed. Because the MCS-51/52 series processors process an 8-bit command set, each of the memory addresses is 1-byte (8-bit) and the internal data memory is limited to 256-byte. Therefore, when stack memory cannot be extended, a user has to be aware of the stack size and has difficulties in programming.

SUMMARY OF INVENTION

It is therefore a primary objective of the claimed invention to provide a method for increasing the memory in a processor to solve the above-mentioned problems.

According to the claimed invention, the method for increasing memory in the processor comprises the following steps: (a) extending the internal memory in the processor, (b) adding bits to data addresses and the register addresses with an address extender, and (c) adding bits to the stack addresses with a stack pointer generator so that the processor is capable of accessing memory addresses larger than the bit width of the command set of the processor, carrying the bits over when the stack addresses exceed the limit of the conventional memory, and accessing the stack data exceeding the conventional memory in the extended memory. The method further comprises providing a high stack address, and storing the overflow bits at the high stack address when the stack address exceeds the limit of the conventional memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
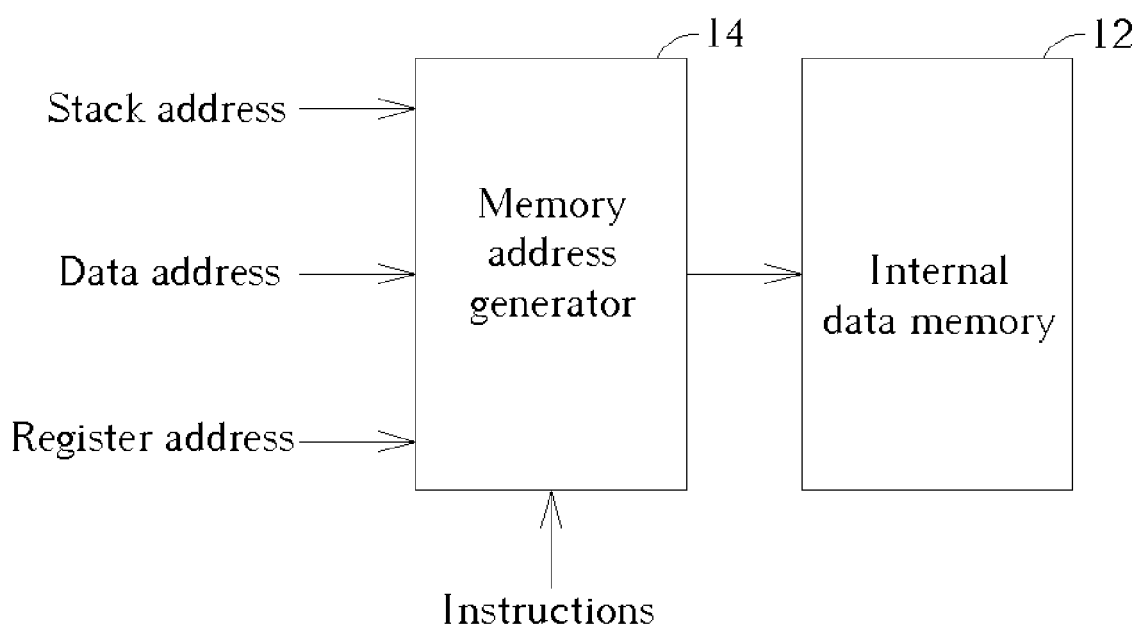
FIG. 1 is a diagram of an internal data memory in a MCS-51 series processor according to the prior art.
Figure 2:
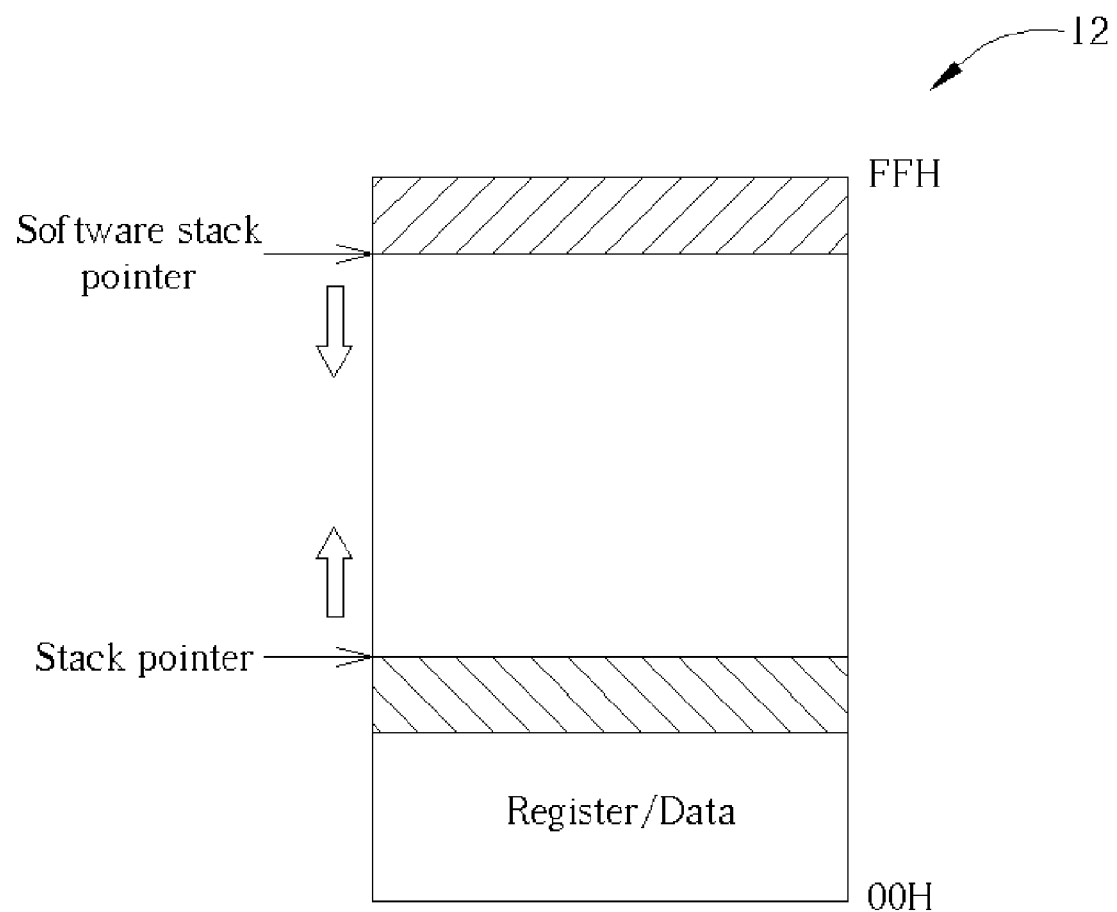
FIG. 2 is a diagram of the internal data memory comprising two stacks according to the prior art.
Figure 3:
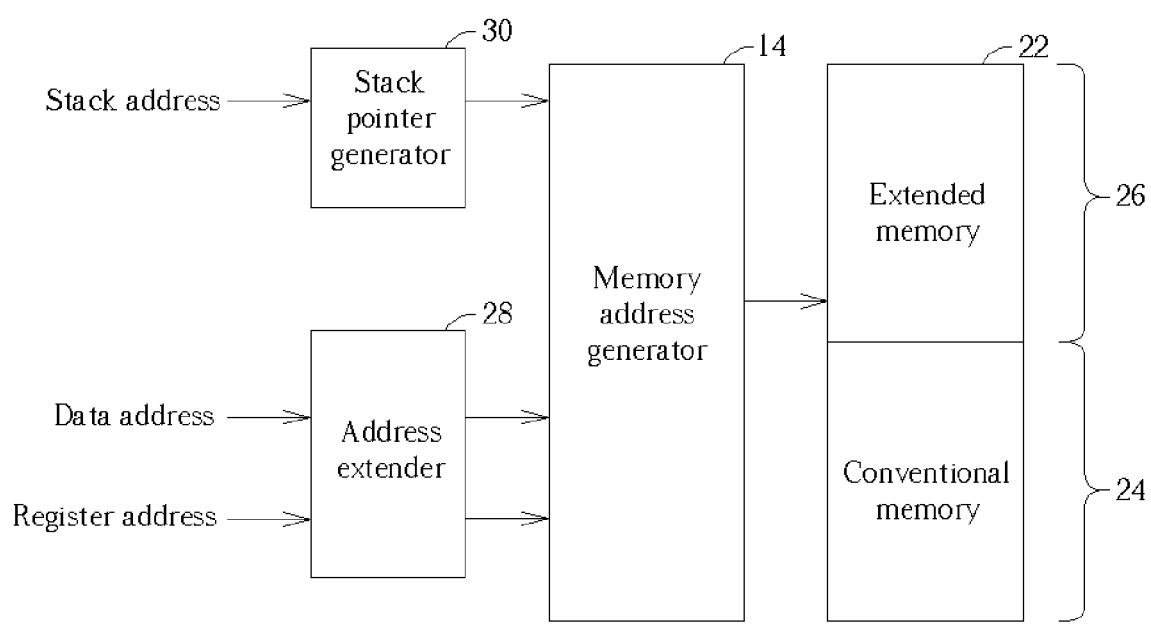
FIG. 3 is a diagram of an internal data memory in a processor according to a present invention.

FIG. 3 is a diagram of an internal data memory 22 in a processor according to the present invention. The internal data memory 22 comprises a conventional memory 24 (usually with a capacity of 256 bytes) and an extended memory 26. Because the internal data memory 22 is larger than the memory of a traditional processor, more bits are needed to specify the internal data memory 22 addresses. Although the processor only processes an 8-bit command set, the processor can access the internal data memory 22 by adding bits to the original addresswith an address extender 28 and transforming the extended address into a memory address with a memory address generator 14. In this way, the 8-bit command set does not need to be changed. And the extended memory 26 of the present invention can be used for the stack memory because of the procedure for accessing the stack. When using a stack, data pushed onto the stack can be popped from the stack only after data, which has since been pushed onto the stack, is first popped from the stack. In other words, the last data pushed onto the stack is the first data to be popped from the stack. Data can be continuously pushed onto the stack as long as the extended memory 26 is of sufficient size. When using the stack, a stack pointer points to a memory address as a beginning position of the stack. Limited to the bit width of the command set of the processor, the stack pointer can only point to memory addresses up to FFH according to the prior art. If new data is pushed onto the stack while the stack pointer is pointing to a memory address at FFH, the stack pointer will roll over and point to 0, thus the new data will overwrite the data stored previously at the beginning position of the stack. Therefore, the method of the present invention comprises adding bits to the stack pointer with a stack pointer generator 30 and transforming the address pointed to by the stack pointer into a memory address of the extended memory 26 with the memory address generator 14. In this way, the processor can access the extended memory 26. Most important of all, when the stack pointer is pointing to the memory address FFH, the stack pointer generator 30 carries over the bits when new data is pushed onto the stack and stores the overflow bit in a high stack address. The high stack address is combined with the stack pointer to form the full stack address. The extended memory 26 is used to store the new data after the memory address generator 14 transforms the full stack address into a memory address. As described previously, the stack data is accessed in a special order, thus there is no need to point to a specific address when accessing the stack data and there is also no need for the stack pointer to contain the high address or to change the MCS command set.

Figure 4:
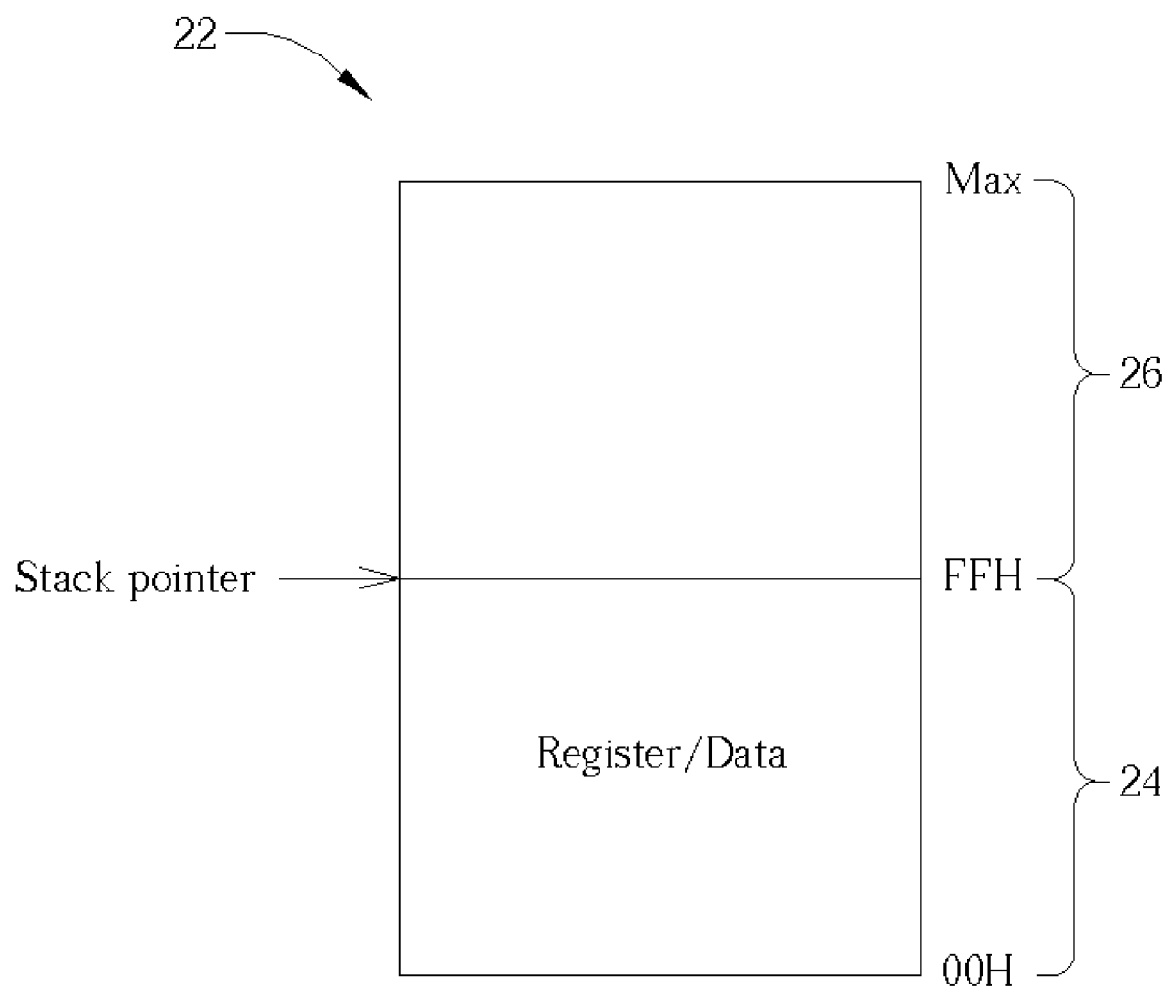
FIG. 4 is a diagram of the configuration of the internal data memory according to the present invention.

FIG. 4 is a diagram of the configuration of the internal data memory 22 according to the present invention. The internal data memory 22 is divided into two segments. One segment is the conventional memory 24, and the other segment is the extended memory 26. The conventional memory 24 is shared by the data memory and the register memory. The extended memory 26 will be used to store the stack data when the conventional memory 24 is not enough. To enlarge the data memory and the register memory within the conventional memory 24 without changing the 8-bit common set of the processor, the beginning position of the stack pointer is suggested to be set at the memory address of FFH, which is the limit of the conventional memory 24. Therefore, the data memory and the register memory share the whole space of the conventional memory 24, and the extended memory 26 can store the stack data by the means of the stack pointer generator 30.

Figure 5:
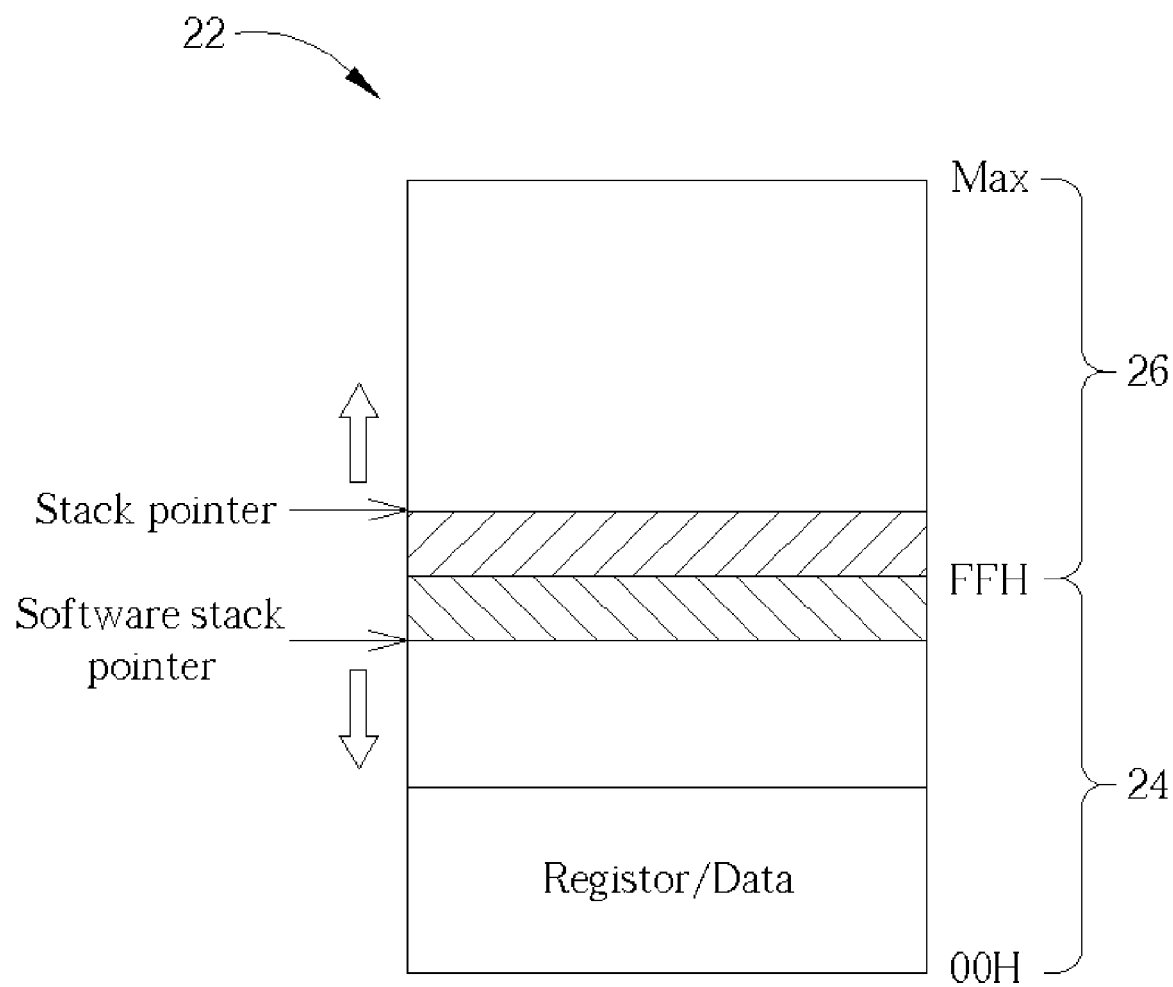
FIG. 5 is a diagram of the internal data memory comprising two stacks according to the present invention.

FIG. 5 is an example of how to arrange memory when a software stack is needed. It shows a diagram of the internal data memory 22 comprising two stacks according to the present invention. The stack pointed to by the stack pointer stores the program counter for calling subroutines or data set by the user. The software stack pointed to by a software stack pointer stores parameters, which are sent while programs call the subroutines. If the user needs to enlarge the two stacks without changing the command set of the processor, the user can set the beginning position of the stack pointer at an address not higher than FFH, and set a beginning position of the software stack pointer at a lower address next to the beginning position of the stack pointer. As shown in FIG. 5, the address pointed to by the stack pointer increases as data comes in while the address pointed to by the software stack pointer decreases as data comes in. This way the two stacks won't overlay each other.

According to the foregoing description, the internal data memory 22 not only comprises the conventional memory 24, but also the extended memory 26. Even though the processor only processes an 8-bit command set, the processor can access the internal data memory 22 by adding bits to the original addresswith the address extender 28 and transforming the extended address into the memory address with a memory address generator 14. Limited to the bit width of the command set of the processor, the data memory and register memory can only use the space of the conventional memory 24. However, the stack data can be store in the extended memory 26 when there is no extra space for the stack data in the conventional memory 24 because the stack pointer generator 30 carries over the address bits when data is pushed onto the stack and the stack pointer is pointing to the memory address at FFH. The overflow bits are stored in a high stack address and the stack pointer generator 30 combines the high stack address with the stack pointer to form a full stack address. According to the embodiments described previously, without changing the command set of the processor, the data memory and the register memory can use almost the entire space of the conventional memory 24 by setting the stack pointer at the address of FFH. Therefore, the stack memory size is equal to the size of the extended memory 26. When the user needs software stack to store parameters sent by programs, the user could set the software stack pointer to the address below the stack pointer. The address pointed to by the software stack pointer decreases downward and uses the remaining space of the conventional memory 24.

In contrast to the prior art, the present invention provides a method for increasing the internal data memory in the processor. Although memory in the processor can be extended via an external data memory, the capacity of the stack memory is still limited to the internal data memory in the processor. The present invention increases the internal data memory and processes the extended stack data via the stack pointer generator and the high stack address so that the processor can access the extended memory for stack memory. To summarize, the present invention increases the stack memory.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for increasing the size of an internal memory in a processor, wherein the internal memory comprises a conventional internal memory, the method comprising:

providing an extended internal memory in the processor, wherein the conventional internal memory and the extended internal memory are in a same block of memory, and adding bits to stack addresses with a stack pointer generator so that the processor is capable of accessing memory addresses larger than a data width of a command set of the processor, and can use the extended internal memory as a stack, wherein the stack data stored in the extended internal memory is accessed by pushing data onto and popping data from the stack when the stack pointer initially points to any memory address of the conventional internal memory.

2. The method of claim 1 further comprising:

adding bits to data addresses and register addresses with an address extender.

3. The method of claim 1 wherein adding bits to the stack addresses with the stack pointer generator further comprises providing a high stack address, and storing the extra bits in the high stack address when the stack address exceeds the limit of the conventional internal memory.

4. The method of claim 1 wherein the processor is a MCS series processor.

5. The method of claim 1 wherein the CPU processes an 8-bit command set.

6. The method of claim 5 wherein the capacity of the conventional internal memory is 256-bytes.

7. The method of claim 1 wherein data, registers, and stacks share the conventional internal memory.

8. The method of claim 1 wherein the extended internal memory is only for storing stacks.

9. A chip for executing the method of claim 1.

10. The method of claim 1 further comprising setting an initial position of a stack pointer of the stack equal to an ending address of the conventional internal memory.

11. The method of claim 1 further comprising providing a stack pointer register for pointing to a first stack, and providing a second stack pointer for pointing to a second stack.

12. The method of claim 11 further comprising increasing a memory address of the stack pointer when data is added to the first stack, and decreasing a memory address of the second stack pointer when data is added to the second stack.

13. The method of claim 12 further comprising setting an initial address of the first stack pointer equal to an ending address of the conventional internal memory.

14. The method of claim 12 further comprising setting an initial address of the second stack pointer equal to an address next to an ending address of the conventional internal memory.

15. The method of claim 11 wherein the first stack is utilized for storing a program counter parameter for calling for a subroutine or a set of data from the user, and the second stack is utilized for storing a set of parameters sent while the subroutine is called.

16. The method of claim 1, wherein the conventional internal memory has a size limited by a data width of a command set of the processor.

* * * * *